Figure 1:
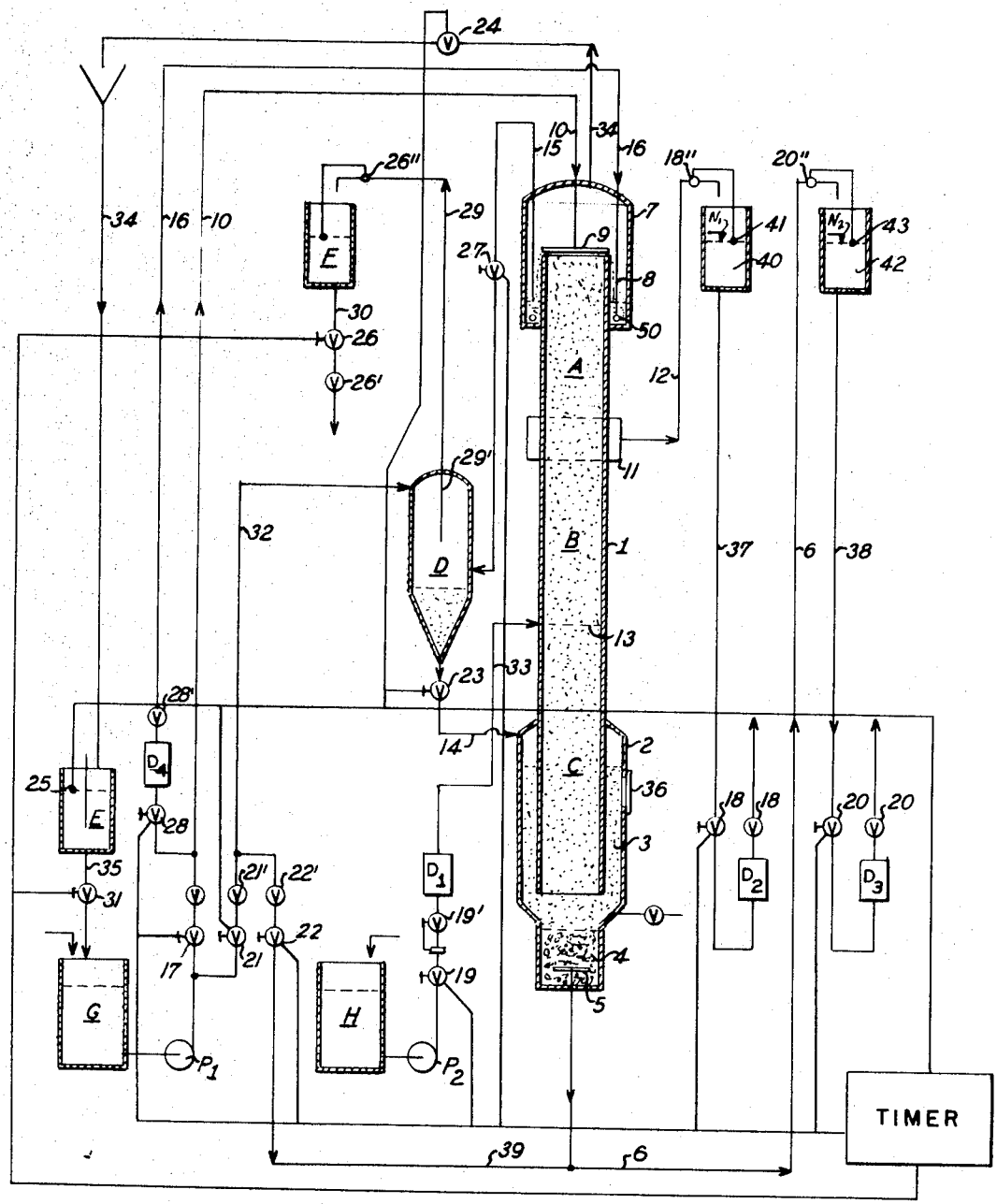

United States Patent

[11] 3,581,894

| [72] | Inventor | Paul Minart<br>Isere, France |
|---|---|---|
| [21] | Appl. No. | 737,098 |
| [22] | Filed | June 14, 1968 |
| [45] | Patented | June 1, 1971 |
| [73] | Assignee | Societe Grenobloise d, Etudes et d, Applications Hydrauliques (Sogreah)<br>Grenoble, France |
| [32] | Priority | June 14, 1967 |
| [33] | | France |
| [31] | | 5126 |

[54] INSTALLATION FOR THE TREATMENT OF WATER AND AQUEOUS SOLUTIONS
12 Claims, 3 Drawing Figs.

[52] U.S. Cl. .................................................. 210/96,
210/139, 210/189
[51] Int. Cl. ................................................ B01d 15/04
[50] Field of Search .......................................... 210/96,
139, 189, 97

[56] References Cited
UNITED STATES PATENTS

| 2,564,717 | 8/1951 | Olsen ........................... | 210/189X |
| 2,815,322 | 12/1957 | Higgins ........................ | 210/189X |
| 3,056,743 | 10/1962 | Eichhorn et al. ............. | 210/189X |
| 3,194,663 | 7/1965 | Higgins ........................ | 210/96X |

*Primary Examiner*—John Adee
*Attorneys*—Sylvester J. Liddy, John J. Hart, Joe E. Daniels and Charles E. Baxley ABSTRACT: A single column contains a moving ion-exchange bed in which the treatments of regeneration, washing and exhaustion are effected simultaneously in three different vertical sections of the column. The successive batches of exchange resins are fed into the bottom of the column so as to bring about the intermittent progression of the bed, and each successive batch of resins is recovered at the top of the column. The rates of flow of the purified liquid, the regenerant flow and the discharged effluent are controlled so that the raw liquid inflow rate automatically adjusts itself to assure that an adequate flow distribution will be maintained in the different sections of the column.

INVENTOR

John J. Hart
ATTORNEY

INVENTOR
PAUL MINART

INVENTOR
PAUL MINART
BY

John F. Hart
ATTORNEY

INSTALLATION FOR THE TREATMENT OF WATER AND AQUEOUS SOLUTIONS

THE INVENTION

This invention relates to an installation for treating liquids by means of moving-bed ion-exchange resins, as in softening, decarbonation, demineralization, etc. treatments.

The installation of this invention is based on the fact that in the aforesaid forms of treatment, the regenerant is a comparatively highly concentrated solution which is denser than the liquid to be treated. It is also based on the finding that purified liquid can be used to rinse or wash the exchange equipment after regeneration. Further, as the exhaustion bed in such installations tends to become fouled up in a comparatively short time with fine particles of various materials which are present in the raw liquids to be treated, the installation of this invention is designed to clear out these fine particles from the exchange resins before regeneration.

In accordance with this invention there is provided an improved installation for the treatment of liquids by means of moving-bed ion-exchange resins with intermittent upward motion of the bed, having the following characteristic features:

a. A single column contains the moving ion-exchange bed in which the three successive forms of treatment, namely regeneration, washing and exhaustion are effected simultaneously in respective sections of the column one above the other. The regeneration section containing the densest solution is located in the bottom part of the column. Next above the regeneration section is the washing section, and in the top part of the column is located the exhaustion section.

b. The recovery of each successive batch of exchange resins is effected by causing it to spill over from the top of the column into a chamber in which a flow of raw liquid diverted for the purpose fluidizes them and conveys them to a separator. The separator is constructed and arranged to separate out and eliminate by cyclonic action the fine particles of material retained in the bed during exhaustion; the raw liquid being evacuated therefrom by means of a constant-discharge controlling device.

c. The exhausted exchange resins are conveyed from the bottom of the column to the regeneration section and bring about the intermittent progression of the bed.

d. The rates of flow of the purified liquid and the effluent discharging from the column are controlled.

e. The rate of regenerant flow is maintained at a set value, which may be varied as required.

f. Means are provided to ensure that the raw liquid flow rate stays matched to the constant rates of flow of the purified liquid and the conveying and washing effluent whilst allowing for possible head loss variations in the various sections of the exchange resins bed.

Figure 2:
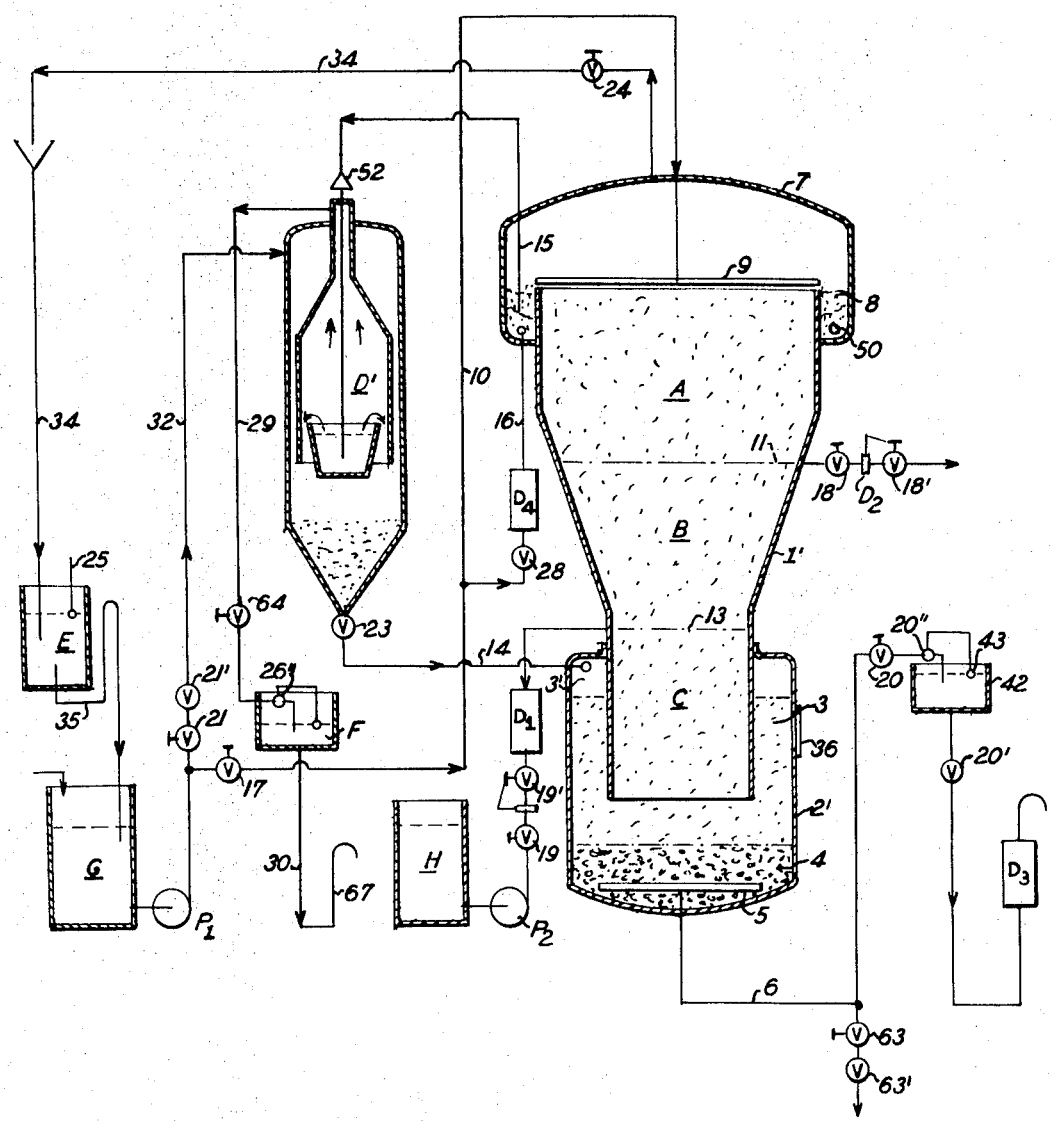
Figure 3:
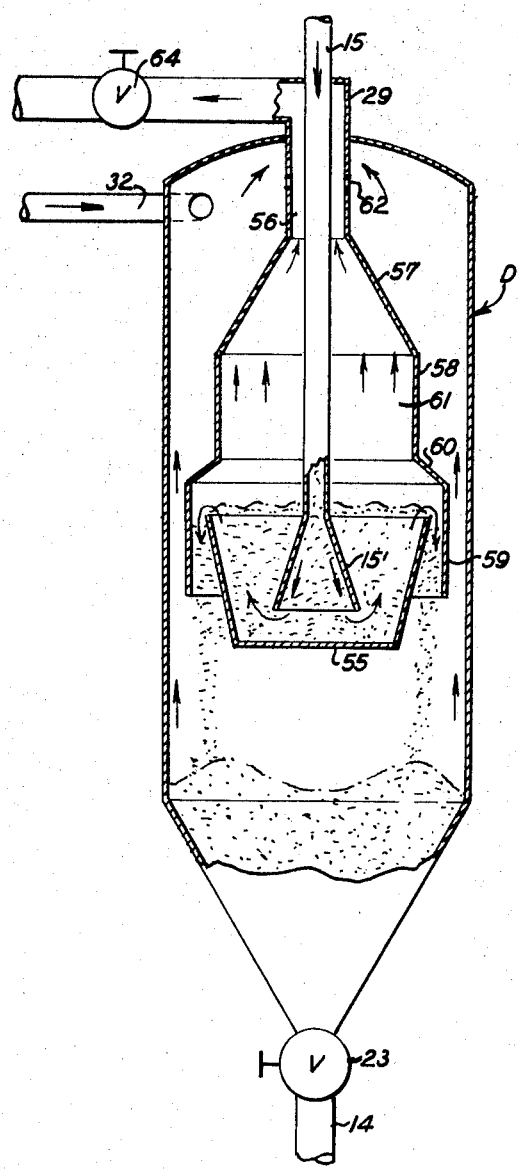

In order that a better understanding of the invention may be obtained, reference is made to the accompanying drawings in which FIG. 1 shows by way of example a diagrammatic view of an installation embodying the invention in which the exhaustion, regeneration and washing processes take place in a rising ion-exchange bed in one and the same column of constant cross section;

FIG. 2 is a diagrammatic view of an installation embodying the invention provided with a modified form of column; and FIG. 3 is an enlarged diagrammatic view of the separator shown in the embodiment of FIG. 2.

The installation shown in FIG. 1 of the drawings, comprises a column 1 featuring three treatment sections one above the other, namely an exhaustion section A, a washing section B and a regeneration section C. Section C containing the densest solution, is at the bottom of the column, section A containing the least dense liquid is at the top of the column and section B containing purified liquid of a similar density to that of the raw liquid in section A is in between. This arrangement ensures the absence of density currents between the sections. The column 1 preferably has the same cross section throughout its length.

When in the use of the installation the regenerant discharge is very much lower than that of the liquid to be treated, the regenerant feed time may be reduced to an appropriate fraction of the exhaustion time in order to maintain sufficient flow velocity in the regeneration section to ensure no preferential flow paths can form. It will be understood, however, that the same result may also be achieved by appropriate reduction in the size of the working cross section at the regeneration section C, or by combining such modification of section C with a reduction in regeneration feed time as aforesaid.

Enclosing the lower portion of the cylindrical body 1 of constant cross section is a base 2 forming an annular chamber 3 around such lower portion. Below the chamber 3 and underneath the resin in column 1 is a layer 4 of inert granular material in which is embedded an outlet strainer 5 connected to an outlet pipe 6. The top end of the ion-exchange column 1 is sealed by an end cover 7 forming an annular chamber 8 surrounding the upper end portion of the column body 1. The top rim of the column body 1 acts as a peripheral weir or spill for the resin.

The raw liquid is fed into the top of column 1 through a strainer 9 located at very nearly the same level as the said upper rim thereof. The raw liquid is fed to the strainer 9 by a pipe 10 supplied by a pump $P_1$ from a tank G. The treated liquid discharges from column 1 through an annular filter 11 or through transverse strainers of known construction into a pipe 12, the rates of flow being so arranged that part of this treated liquid continues on down the column and washes the resin in section B.

The regeneration liquid is fed into the column from a tank H by a pump $P_2$ via a pipe 33 and a strainer 13. The rate of regeneration flow from tank H through pump $P_2$ is controlled at a set value by a flow measurement device $D_1$ associated with a regulating valve 19'. It discharges from the column with the washing liquid through the strainer 5 and the outlet pipe 6.

Metered volumes of exhausted resin are fed from a tank D to the foot of the column 2 through a pipe 14 and the chamber 3, and then rise up column 1 with an intermittent motion and spill into the upper annular chamber 8. A transparent inspection port 36 is provided on the base 2 to enable the resin content of the system to be checked when required. The resin deposited in chamber 8 is fluidized by the injection of raw liquid from tank G through a pipe 16, and is then extracted in such fluidized condition by a pipe 15 which is connected to the tank D. The discharge of pipe 16 into the peripheral zone 8 is controlled by a valve 28' at the entry end of such pipe and measured by an associated flow measurement device $D_4$.

Exhaustion, washing and regeneration take place simultaneously while the resin bed is stationary between its intermittent periods of motion. These three treatment processes are stopped after definite time intervals controlled by a time switch which controls the sequence of operations in the installation in accordance with a set program. At the end of each such time interval valves 17, 18, 19 and 20 are caused to be closed and valves 21, 22, 23 and 24 opened. The raw liquid pumped by pump $P_1$ then flows from tank G to tank D through valve 21 and pipe 32 at a pressure set by control valve 21'. This flow of the raw liquid into and through tank D at the set pressure carrier with it exhausted resin from the bottom of tank D and transports it through pipe 14 to the base 2 of column 1 where it is distributed evenly within the bottom peripheral zone 3 formed in such base. A part of the discharge from pump $P_1$ may also find its way through valve 22 and pipe 39 directly into the bottom of column 1 through strainer 5. Being a continuous mass, the resin bed in column 1 will under the pressure of the raw liquid move bodily upwards like a piston. The raw liquid so inserted into column 1 will discharge from the top of the column into the chamber formed by the end cover 7 and will flow from such chamber through a pipe 34 and valve 24 to a tank E. When the level of the liquid in tank E reaches a set position of the float 25, means are actuated to close valves 21, 22, 23 and 24 and thereby stop the resin motion in column 1. The injected liquid volume controlled by the position of float 25, the displaced volume of resin in the column 1, and the volume of tank D are such that valve 23 is flushed through before it closes. Control valves 21' and 22' are set to give the resin bed a rate of rise of about 1 centimeter/second so that reworking of the mass is reduced to a minimum, i.e. there is practically no relative motion between individual resin particles and resin attrition by intergranular friction is thereby reduced to a minimum.

When valves 21, 22, 23 and 24 have been closed as aforesaid, means are also actuated to open valves 17, 18, 19 and 20 again and all the treatment processes again start up and are repeated simultaneously. Thus, the raw liquid will again be pumped from tank G by the pump $P_1$ and through the pipe 10 to the top end of column 1 and the regeneration liquid will again be pumped from tank H by the pump $P_2$ to the strainer 13 by way of pipe 33. As the orifices in the strainer 9 face upwardly, the whole displaced batch of resin will spill over into the top peripheral zone 8. Valves 26, 27 and 28 then open and the exhausted displaced resin in the annular space 8 is fluidized and rinsed through such space by a jet of liquid discharging from the pipe 16 and is then conveyed away through the pipe 15 and valve 27 to the tank D. The thus conveyed exhausted resin will also take with it any impurities it may have become contaminated with by such peripheral flow. In tank D, the carrier liquid is separated from the resin by cyclonic action. The separated liquid is discharged through pipe 29 to a tank F, and from the latter through a pipe 30 and valve 26 to the drains. The discharged liquid carries with it any solid impurities the exhaustion bed may have retained. The flow conveying the resin to tank D is controlled by a valve 26' which is associated with valve 26 and acts in association with a float valve 26'', such flow being set so that it is at a constant slightly higher rate than the liquid discharge from pipe 16 and the flows of the treated liquid and effluent from the column 1 and such that any impurities in the peripheral flow in zone 8 are carried into pipe 15 and none are able to find their way back to the exhaustion bed A. Instead of finally discharging the carrier liquid to the drains, it is contemplated that it may, as an alternative, be filtered out and recirculated back into the system. The washed exhausted resin settles out in the cone-shaped bottom of tank D, from which it is periodically fed through pipe 14 to the foot of the column 2 during intermittent motion of the resin in column 1.

Just before the batch of resin finishes flowing from the space 8 to tank D, the valves 26 and 28 will close, and after a short lag to allow any resin still in the vertical link pipe 15 to settle out, valve 27 will close in clear liquid. At the same time, a valve 31 for controlling the flow of liquid from tank E, opens, thereby allowing the tank E to empty out completely through pipe 35, whereupon valve 31 closes again. The raw liquid draining from tank E through pipe 35 is fed to the raw liquid tank G from which it is pumped into the system by pump $P_1$. Once these operations have taken place the system is ready for the resin bed to move another step upwards in the manner previously described.

As previously explained the treated liquid passes from the column 1 through a filter 11 and is conveyed by pipe 12 to a tank 40 having an adjustable float 41 for a float valve 18'''. From the tank 40 the treated liquid flows through a pipe 37 to a place of discharge. The volume of treated liquid that is discharged from the system is set by a control valve 18' in outlet pipe 37 and is measured by an associated flow measurement device $D_2$. The float valve 18'' in pipe 12 automatically compensates for any exhaustion bed head losses, so that the discharge through 18' will remain constant. The effluent that is discharged from the bottom of column passes through the pipe 6 to a tank 42 provided with an adjustable float 43 for a float valve 20''. From tank 42 the effluent passes through an outlet pipe 38 to a place of discharge. The discharge of effluent is kept constant by a control valve 20' in outlet pipe 38 acting in association with the float valve 20'' in pipe 6 and is measured by flow measurement device $D_3$ associated with valve 20'. The effluent discharge $D_3$ must be higher than the regeneration liquid discharge $D_1$ in order to compensate both for the liquid flow accompanying the resin bed motion and for the resin washing flow after regeneration. As the three outflows from the column and the regeneration liquid flow are controlled at constant rates, the raw liquid inflow rate automatically adapts itself. Consequently, the washing flow also remains constant.

It will be noted that all the liquid outlets of the installation are above the column 1. Accordingly, no part of the column 1 can ever be under subatmospheric pressure, whatever the rate of flow. As the rates of flow are controlled near ground level at an appreciable distance below the levels $N_1$ and $N_2$ controlled by the floats 41 and 43, respectively, any changes in the float positions have practically no effect on the preset rates of flow. As the regeneration zone C is in the bottom part of the resin bed, the distribution of the densities of the two fluids, i.e. the liquid to be treated and the regeneration liquid, will remain stable both when the installation is in operation and is at rest. The adequate distribution of the various inflows and outflows and the fact that this distribution remains steady even though the head loss in the resin bed may vary, will prevent any permanent rise of regeneration liquid up the column. The purified liquid and effluent outflow rate and regenerant inflow rate control arrangements provided in the installation in accordance with the invention ensure that an adequate flow distribution will be maintained in the various parts of the column. The general arrangement of the installation and the timing of the various operations effected with the aid of valves are such that the said valves never close on resin, which avoids damage to the latter.

In the embodiment shown in FIGS. 2 and 3 of the drawings, those parts which are similar to the parts contained in the embodiment of FIG. 1 have been given similar reference characters. The embodiment of FIGS. 2 and 3, like the embodiment of FIG. 1, includes a column 1' provided with a base 2' which forms a peripheral space 3 at the foot of the column. The top of the column 1' is provided with a cover 7 which forms a peripheral space or chamber 8. The column 1' is filled with resin up to its top edge which forms a peripheral weir and on which rests the raw water supply strainer 9. The resin bed lies on a layer 4 of inert granular material containing the embedded regeneration effluent outlet strainer 5 through which the effluent discharges into a pipe 6. The bottom of the resin bed communicates with the lower peripheral space 3 inside which resin accumulates up to a level which is visible through the inspection port 36. The purified water outlet strainer 11 and the regenerant feed strainer 13 are at levels two-thirds and one-third up the height of the column, respectively, and define the three bed sections constituting the exhaustion zone A, the rinsing zone B and the regeneration zone C. It will be noted however, that the column 1 differs from column 1 in that the center portion thereof is in the shape of a truncated cone so that the upper cylindrical end portion thereof is of enlarged diameter and the lower cylindrical end portion thereof is of reduced diameter. Thus, the regeneration zone C in the embodiment of FIG. 2 has a much smaller cross-sectional area than the exhaustion zone A. This design of column 1' is utilized because in the embodiment of F.G. 2 the rate of regenerant flow is low compared to the rate of exhausting flow.

As in the embodiment of FIG. 1 the exhausted resin is fed from a separator D' and through a pipe 14 which discharges into a resinless zone 3' in the upper portion of the chamber 3. Also as in the embodiment of FIG. 1 part of the raw water fed from the tank G passes through a pipe 16 to a perforated torus 50 in the bottom of the upper peripheral space formed in the chamber 8 to fluidize the exhausted resin which periodically settles out in this space and from which it is discharged through a pipe 15 to the separator D'.

In the embodiment of FIG. 2, the purified water discharged from column 1' through the filter 11 is not fed to a tank 40 as in the embodiment of FIG. 1, but its flow is controlled by valve 18 and its rate of flow is set to the requisite value by the flow measurement device $D_2$ and the control valve 18'. The rate of regenerant flow from pump $P_2$ to the strainer 13 in column 1' is set as in the embodiment of FIG. 1 to the requisite value by a measurement device $D_1$ with the aid of a control valve 19'. The rate of effluent flow is set to the requisite value as in the embodiment of FIG. 1 by a measurement device $D_3$, a float valve 20'' and a control valve 20'. The rate of effluent flow is set to a valve $D_3$ which is greater than $D_2$ in order to effect the rinsing of the resin and to compensate during the treatment phase for the accompanying flow causing the upward resin bed movements. The raw water feed rate adapts itself to this automatically. It will be noted that in the embodiment of FIG. 2 a portion of the raw liquid discharge from the pump $P_1$ is not fed into the bottom of the column 1', thereby eliminating the need for automatic valve 22, and that the tanks F and 42 thereof are lower than the tanks F and 42, respectively, in the embodiment of FIG. 1. The three treatments in the column of the embodiment of FIG. 2, as in the embodiment of FIG. 1, are interrupted at set time intervals controlled by a time switch and in a similar manner.

Considering now the operation of the unit depicted in FIG. 2, the treatments in column 1' are interrupted by closing the automatic valves 17, 18, 19 and 20 and opening the automatic valves 21, 23 and 24. When this has been done a set volume of water is fed to tank D' at a set pressure controlled by valve 21'. This volume of water causes tank D' to empty out completely and distributes the resin charge evenly within peripheral space 3' in the column 1'. At the same time the resin bed being a continuous mass is moved bodily upwards like a piston. If necessary, and to complete the rinsing through of valve 23 before it closes, there is provided an additional automatic valve 63 which opens at the same time as the valves 21, 23 and 24. A small part of the volume fed to tank D' and controlled by valve 63' is discharged to the drains. This arrangement may also be employed in the embodiment of FIG. 1 to the same end.

The raw water discharges from the top part of the column 1' through valve 24 and collects in tank E. When the water level reaches the level detector 25, valves 21, 23, 24, and if necessary also valve 63, close and in so doing stop the resin bed motion. Tank E empties automatically by siphon action after each column movement and the raw water thus recovered is recirculated back to tank G.

At the end of the column movement valves 17, 18, 19 and 20 reopen and the three treatments start up again simultaneously. During such treatments, the displaced resin charge overflows into the peripheral space 8 at the top of the column. Valve 64 opens and causes a nonreturn valve 52 at the top of the tank D' to open. The exhausted resin is then fluidized by part of the raw water flowing at a rate $D_4$ which is set by control valve 28. The resin and impurities are conveyed through pipe 15 and nonreturn valve 52 to separator D' by a flow controlled at a given rate by a float valve 26'' working in conjunction with a swanneck outlet pipe 67 which is adjustable for height. This flow rate of the resin is greater than the flow rate $D_4$ of the raw water and such that the solid impurities are carried away by the flow to the outlet pipe 67, whilst the exhausted and rinsed resin is enabled to settle out in the bottom of separator D'. The flow to the outlet pipe 67 may be discharged to the drains or, alternatively, may be filtered and recirculated back to supply tank G. When nearly all the resin has been conveyed away, valve 64 closes and any resin still upstream of nonreturn valve 52 settles out and passes through it, so that it closes in clear water at the next column movement, when separator D' is put under pressure.

It will be observed from the foregoing that in both embodiments of the invention the fluidization tanks D,D' are in the shape of a truncated cylindrical cone. This configuration, it has been found possesses the advantages that it enables the resin charge to be readily fluidized and to be stored after rinsing until it is fed back into the column to cause upward movement of the bed. It will also be noted that the resin is fluidized with the raw liquid to be treated before regeneration so that subsequent regeneration takes place with a resin which has been rinsed and rid of its solid impurities. Further, as the resin is fluidized with the aid of the accompanying flow of water which conveys the exhausted resin away from the exhaustion zone, no separate fluidization flow is necessary thereby making for simpler operation of the installations. It is also within the contemplation of this invention to so fluidize and rinse the resin with a separate rinsing liquid, such as for example the sugar extraction water in a sugar factory, instead of the raw liquid that is to be treated. In either case, the fluidization liquid, whether the raw liquid to be treated or a rinsing liquid, can be filtered and recirculated back into the system. The type of fluidization tank D' embodied in the system shown in FIG. 2 of the drawings possesses the added advantage that it prevents impurities from finding their way back into the rinsed resin, even though fluidization is not continuous. As in such embodiment the rinsing solution is not used to eliminate the impurities added during fluidization of the resin, it adds to the regenerant flow thereby ensuring its full use. A better understanding of how the fluidization tank D' accomplishes these added advantages can be obtained from the consideration of the enlarged view thereof shown in FIG. 3 of the drawings.

It will be observed from FIG. 3 that resin feed pipe 15 enters the tank D' at the center of its top end. This pipe is both axial and vertical and extends down to one-half or two-thirds of the depth of the tank. A diverging section 15' formed at the bottom end of this pipe is immersed in a frustoconically shaped coaxial basin 55. It will be noted that because of such arrangement the areas of the cross sections in the feed line of the fluidized liquid within the tank increase from the connection of the diverging section 15' to the pipe 15 and thereafter throughout the depth of the basin 55. The rim of the basin acts as a peripheral weir for the resin.

The impurity-laden liquid discharge pipe 29 connecting tank D' with the tank F also enters the tank D' at the center of its top end and encloses and is concentric with the pipe 15 within the tank D'. The portion of pipe 29 within the tank includes an upper cylindrical portion 56 forming the entry end of the pipe, a frustum-shaped portion 57 diverging downwardly from the entry pipe end portion 56, an enlarged cylindrical portion 58 depending from the enlarged end of portion 57, and a further enlarged cylindrical terminal portion 59 connected by a flared portion 60 to the lower end of portion 58. The cylindrical portion 58 forms a cylindrical chamber 61 above the basin 55 and the cylindrical portion 59 forms with the basin 55 an annular discharge passage for the fluidized resin flowing over the rim of the basin and directing such resin toward the bottom end of the tank D'. The drain valve 23 connects the bottom of the truncated cone to the pipe 14 which leads into the upper resin free portion 3' of the chamber 3 in the column base 2', and the pipe 32 from the pump $P_1$ leads tangentially into the cylindrical upper portion of tank D'.

It will be understood from the foregoing description, that the impurity-laden exhausted resin charge and the liquid conveying it enter the basin 55 through pipe 15. Due to the steadily increasing flow cross section afforded by the pipe end 15'' and the basin 55 a fluidized bed forms in the basin. Rinsed resin grains discharge over the peripheral weir formed by the rim of basin 55 and settle out in the bottom of the tank, whilst the impurities are picked up by the upward flow and are carried to outlet duct 29, which is provided with an automatic valve 64. When fluidization ceases, valve 64 closes, and any impurities left behind in the chamber 61, the converging section 57, or in the end portion 56 of the duct 29, settle out in the basin 55, from which such impurities are finally expelled when the next fluidization process takes place. The valve 64 is shut when the tank empties, valve 23 opens and a certain volume of raw water enters the tank through pipe 32. A spiral cyclone flow forms around the duct 29 portions forming chamber 61 and empties all the resin out of the cone above valve 23. If there is any dirty water in chamber 61, it does not mix with the incoming raw water and this ensures that no impurities are picked up and carried away with the rinsed resin. The rinsed resin may be made to settle out more evenly by providing small holes 62 in the duct portion 56 through which water displaced by the rinsed resin settling out is drawn into duct 29 by the main flow into the latter.

While I have hereinabove described and illustrated in the drawings, preferred embodiments of my invention, it will be apparent to those skilled in the art modifications of such embodiments may be made without departing from the spirit of the invention or the scope of the appended claims.

What I claim is:

1. An installation for the treatment of liquids comprising a column containing an intermittently upwardly movable bed of ion-exchange resins extending from the bottom of such column to the top thereof, and means for effecting simultaneously regeneration, washing and exhaustion treatments in superimposed respective sections of such bed, the regeneration section containing the densest solution being located at the bottom part of the column, the washing section of less dense solution being located in the central part of the column, and the exhaustion section of least dense solution being located in the top part of the column, said treatment-effecting means including means for supplying a flow of regenerant liquid comprising a device at the junction of said bottom and central column parts for distributing the regenerant liquid over the area of the regeneration bed section, a first liquid discharge means below said bottom column part for removing the regenerant liquid flowing down through such regeneration bed section, means for supplying a flow of raw liquid at a given rate comprising a device above said top column part for distributing the raw liquid over the area of the exhaustion bed section, and means including a second liquid discharge means located at the junction of said top and central parts of the column for removing part of the treated raw liquid flowing down through the exhaustion bed section and for permitting the remaining part of the treated raw liquid to pass down through said washing bed section to wash the same and then down through said regenerant bed section to said first liquid discharge means, and said installation comprising means for intermittently supplying between said bottom column part and said first liquid discharge means successive charges of exhausted exchange resins to the foot of the bed in said column so as to effect the upward intermittent progression of the bed, and means for removing exchange resins discharged from the top of the column.

2. An installation as defined in claim 1, in which said exchange resin removing means comprises means at the top of the column forming a first chamber enclosing the top part of the column and into which the exhausted resins spill from the top of the column, means for fluidizing in such chamber the resins discharged from the top of said column, and means for evacuating the fluidized resins from such chamber and feeding the same with the carrier flow to said resin supply means.

3. An installation as defined in claim 2, including a base enclosing the bottom part of said column and having a cross-sectional area greater than that of the bottom part of the column to provide a second chamber enclosing such bottom part of the column and communicating at its lower end with the bottom end of said column, said supplying means supplying the successive charges of resin as a liquid stream to the upper end of said second chamber, and a layer of inert material in the bottom of said base spaced below the bottom end of said column, said first liquid discharge means for removing effluent from said column comprising a discharge device embedded in said inert layer.

4. An installation as defined in claim 3 including means for controlling the rate of flow of purified liquid discharging from the exhaustion bed section in said column into said second liquid discharge means, and the rate of flow of effluent discharging from the regeneration bed section in said column into said first liquid discharge means.

5. An installation as defined in claim 1, in which successive batches of the exchange resins are spilled over the top of the column by said resin-supplying means, and including means forming a first chamber arranged at the top of the column to receive each successive batch of exchange resins spilled over from the top of the column, means for fluidizing the discharged resins in said chamber, a tank, and means for evacuating the fluidized resin from said chamber and depositing it in said tank, said resin-supplying means conveying the exchange resins from said tank to said column so as to bring about the intermittent progression of the bed, means for controlling the rates of flow of the liquids discharging from said column into said first and second liquid discharge means, means for maintaining the rate of regenerant flow by said regenerant liquid supplying means at a selected set value, means associated with said raw liquid supplying means for ensuring that the raw liquid flow rate stays matched to given constant purified liquid, conveying and washing effluent flow rates through said parts of said column, and means for controlling the sequence of the operations of the aforesaid means in said installation according to a program.

6. An installation as defined in claim 3, including means for maintaining constant the rates of flows of the purified liquid into said second liquid discharge means, of the conveying liquid supplied, to said supplying means, and of the washing effluent into said first liquid discharge means, and means for ensuring that the raw liquid flow rate stays matched to said constant flow rates allowing for head loss variations in the different sections of the exchange medium bed.

7. An installation as defined in claim 3, including means for controlling the sequence in the operations of said supplying and removing means.

8. An installation as defined in claim 2, in which said resin supply means comprises a separator for separating the resins evacuated from said chamber from the carrier flow by fluidizing, and means for conducting the separated resins to the bottom of said column.

9. An installation as defined in claim 8, in which said separator is constructed to separate out with the carrier flow and eliminate from the resins any fine solid particles retained in the bed during exhaustion, said evacuating means including constant discharge controlling means for controlling the flow of the separated carrier liquid from said separator.

10. An installation as defined in claim 8, in which said separator comprises a closed vertically disposed tank having a conical bottom, a vertically disposed fluidized resin entry pipe extending through the top of said tank in coaxial relation with such tank, a basin spaced upwardly from said conical bottom and receiving the lower end of said entry pipe, a carrier flow discharge pipe enclosing and coaxial with said entry pipe and having an enlarged entry end forming a chamber above said basin, and means for discharging a rinsing fluid into said tank exteriorly of said enlarged entry end of said pipe.

11. An installation as defined in claim 10, in which the lower end of said entry pipe is flared and said basin is frustoconically shaped to provide a graduated, increasing cross-sectional area of discharge of the fluidized resin into said separator.

12. An installation as defined in claim 3, in which said means for evacuating the fluidized resins from said first chamber comprises a separator for separating the resins from the carrier flow, and forming part of said means for supplying resins to the bottom of said column, said separator comprising a closed vertically disposed tank having a conical bottom, an entry pipe for supplying carrier water tangentially to the interior of said tank for conducting the separated resins to the upper part of said second chamber, a carrier flow discharge extending through the top of said tank in coaxial relation with such tank, a discharge valve at the conical bottom of said tank, and a pipe connecting said valve to the upper portion of said second chamber formed by said base.